March 24, 1936.                H. PORTER                2,034,770
                              PISTON RING
                           Filed June 25, 1934
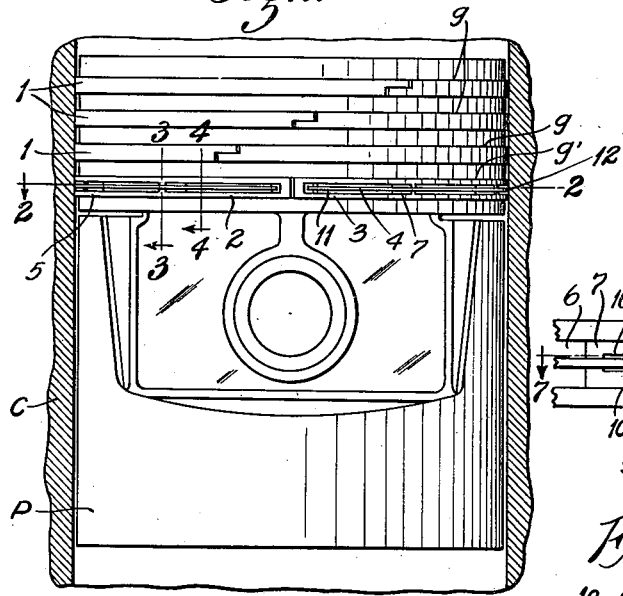
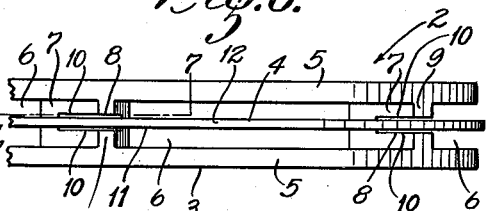
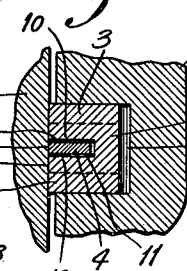
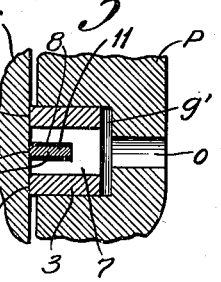
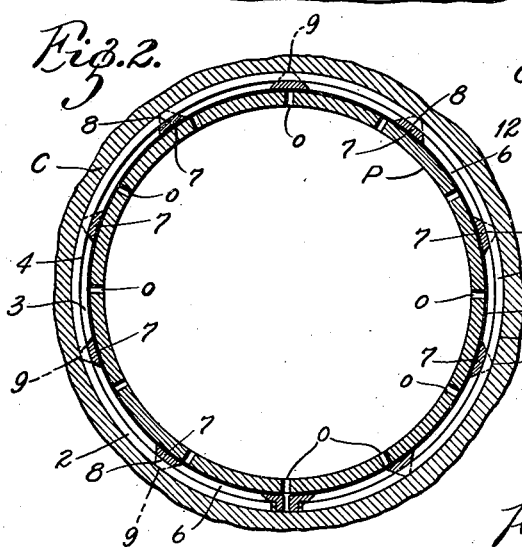
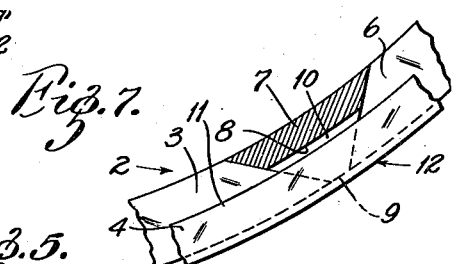
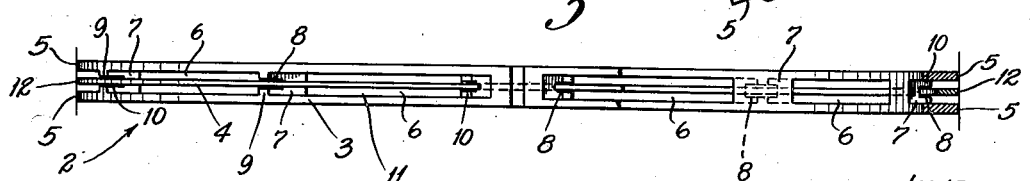
INVENTOR:
HOMER PORTER.
BY Harry A. Benner
                ATTORNEY.

Patented Mar. 24, 1936

2,034,770

UNITED STATES PATENT OFFICE 2,034,770

PISTON RING

Homer Porter, Selden, Kans., assignor to Ramsey Accessories Manufacturing Corporation, St. Louis, Mo., a corporation of Missouri Application June 25, 1934, Serial No. 732,243

2 Claims. (Cl. 309—45)

My invention has relation to improvements in piston rings for internal combustion engines and it consists in the novel features of construction more fully set forth in the specification and pointed out in the claims.

The present invention is concerned primarily with that type of piston ring known in the art as an oil ring, insofar as it is especially adapted to prevent the flow of oil past the piston into the upper compression space of the cylinder, and it embodies features that greatly facilitate oil drainage, as well as features for removing excess oil from the cylinder.

The principal object of the invention is to provide a piston ring capable of holding compression and at the same time embody an oil scraper component which cooperates with oil drainage slots to remove excess oil from the cylinder. A further object of the invention is to associate with a cast iron piston ring a steel scraper element, both ring and scraper element operating independently although they are disposed in nested relation.

A further advantage of the invention is to construct a duplex piston ring that combines simplicity with durability and at the same time may be easily inserted in the piston and cylinder. Further and other advantages will be better apparent from a detailed description of the invention in connection with the accompanying drawing, in which:

Figure 1 is a side elevation of a conventional piston showing my improved ring in the bottom groove thereof, portions of the cylinder walls being shown cross-hatched; Fig. 2 is a horizontal cross section through the piston and ring taken on the line 2—2 of Fig. 1; Figs. 3 and 4 are cross-sectional details through the piston ring taken on the lines 3—3 and 4—4, respectively, of Fig. 1; Fig. 5 is an enlarged side elevation of my improved ring showing a portion of the ring face broken away to expose the inner surface of the ring; Fig. 6 is a further enlarged side elevation of a part of my improved ring; and Fig. 7 is a horizontal longitudinal sectional detail taken on the line 7—7 of Fig. 6.

Referring to the drawing, C represents an engine cylinder in which a piston P is adapted to operate, said piston being provided with a series of ring grooves $g, g, g, g'$ for receiving piston rings 1, 1, 1 and 2. The rings 1 may be of any conventional type, with which the present invention is not concerned, but the ring 2 is an oil ring and forms the subject of this invention. My improved ring 2 consists of two independently acting components 3 and 4. The component 3 is similar to rings now known in the art in that it has two narrow working faces 5, 5 separated by a plurality of oil drainage slots 6 extending entirely around the circumference of the ring.

Between each pair of adjacent slots 6, 6 there is a narrow bridge 7 of triangular shape. The width of the slots 6 is approximately twice that of each face 5, and across each bridge 7 there is a groove or kerf 8 extending inwardly from the outer face 9 of the bridge a trifle more than one-half the depth thereof. The kerfs 8 of the bridges 7 form oppositely disposed confining walls 10, 10 in each of the bridges 7, 7 for holding a thin steel ring 11 in nested relation with the ring component 3. The steel ring 11 is of such depth that when it is seated in the kerfs 8 it may be compressed so that its outer working face 12 will be flush with the working faces 5, 5 of the ring component 3. When there is no pressure exerted against the steel scraper ring 11 it will expand so as to extend beyond the faces 5, 5, as shown in Fig. 7. Since the scraper element 11 is free to expand and contract independently of the ring component 3 it exerts its own tension on the cylinder wall independently of the ring component 3; and since the ring component 3 may also expand and contract independently of the scraper element 11 it also exerts its own inherent tension against the cylinder wall. The composite ring performs the function of two separate rings within the compass of but a single piston ring, the function of the ring component 3 being to hold compression and to provide for the venting of surplus oil, and the function of the scraper element 11 being to remove excess oil from the cylinder and allow the same to drain through the wide slots 6 into the groove $g'$ and through ports o back to the crankcase.

While the unit pressure of the scraper element 11 is high, its total pressure, owing to its narrow cylinder contacting face 12, is low, and since the cylinder contacting faces 5, 5 of ring component 3 are quite narrow, the total pressure of the composite ring will hardly be more than that of an ordinary piston ring so that there will be no excessive drag on the piston.

Having described my invention, I claim:

1. A piston ring comprising a resilient split band and an oil scraper component in combination therewith, said band having a series of slots extending around the circumference thereof, and narrow partitions separating adjacent slots, said partitions having kerfs transversely disposed in a common plane, and said scraper component being confined in the kerfs.

2. A piston ring comprising a band and a scraper ring mounted therein, said band and scraper ring being fabricated of different materials, and the said band being provided with oil drainage passageways extending therethrough immediately under said scraper ring.

HOMER PORTER.